US012589534B2

(12) United States Patent
Masumoto

(10) Patent No.: US 12,589,534 B2
(45) Date of Patent: Mar. 31, 2026

(54) POLYPROPYLENE-BASED RESIN EXPANDED BEADS AND MOLDED ARTICLE THEREOF

(71) Applicant: JSP CORPORATION, Tokyo (JP)

(72) Inventor: Hisashi Masumoto, Yokkaichi (JP)

(73) Assignee: JSP CORPORATION, Tokyo (JP)

( * ) Notice: Subject to any disclaimer, the term of this patent is extended or adjusted under 35 U.S.C. 154(b) by 252 days.

(21) Appl. No.: 18/217,651

(22) Filed: Jul. 3, 2023

(65) Prior Publication Data

US 2024/0025093 A1     Jan. 25, 2024

(30) Foreign Application Priority Data

Jul. 22, 2022     (JP) ................................. 2022-117212

(51) Int. Cl.
*B29C 44/44*          (2006.01)
*B29K 23/00*          (2006.01)
*B29K 105/04*         (2006.01)

(52) U.S. Cl.
CPC ........ *B29C 44/445* (2013.01); *B29K 2023/12* (2013.01); *B29K 2105/041* (2013.01); *B29K 2995/0063* (2013.01); *B29K 2995/0097* (2013.01)

(58) Field of Classification Search
CPC .............................. B29C 44/445; C08J 9/232
See application file for complete search history.

(56) References Cited

U.S. PATENT DOCUMENTS

| | | |
|---|---|---|
| 2006/0223897 A1 | 10/2006 | Sasaki |
| 2010/0261000 A1* | 10/2010 | Jones ........................ B32B 5/28 |
| | | 428/313.5 |
| 2018/0215891 A1 | 8/2018 | Kitahara et al. |

FOREIGN PATENT DOCUMENTS

| | | |
|---|---|---|
| EP | 1707592 A2 | 10/2006 |
| EP | 3309197 A1 | 4/2018 |
| JP | 2000129028 A | 5/2000 |
| JP | 2003039565 A  * | 2/2003 |
| JP | 2022-096231 A | 6/2022 |

OTHER PUBLICATIONS

Machine translation JP2003039565A (Year: 2025).*
List of Documents Considered to be Relevant, from European Search Report cited in corresponding European Appln. No. EP23183738 dated Dec. 8, 2023 .

* cited by examiner

*Primary Examiner* — Alexandre F Ferre
(74) *Attorney, Agent, or Firm* — BACON&THOMAS,PLLC

(57)     ABSTRACT

An expanded bead of polypropylene-based resin formed with a through hole that is defined by an inner peripheral surface and that has an average hole diameter of 1 mm or less. The expanded bead has a closed cell content of 85% or more, an average cell diameter of 50 to 300 μm and an inner surface portion that extends along the inner peripheral surface that has an average cell diameter of 5 to 150 μm which is smaller than the average cell diameter of the expanded bead.

11 Claims, 5 Drawing Sheets

POLYPROPYLENE-BASED RESIN EXPANDED BEADS AND MOLDED ARTICLE THEREOF

BACKGROUND OF THE INVENTION

Field of the Invention

The present invention relates to polypropylene-based resin expanded beads and to a molded article of the expanded beads.

Description of Prior Art

Because a polypropylene-based resin expanded beads molded article is light in weight and excels in cushioning property and rigidity, it is used for various applications. One known method for producing such a molded article is an in-mold molding method which includes filling polypropylene-based resin expanded beads in a mold cavity, heating the expanded beads with steam to secondarily expand and fusion-bond the expanded beads into a molded article with a desired shape, cooling the molded article in the mold cavity with water or air, and releasing the molded article from the mold.

When the molded article released from the mold is then left stand at room temperature, steam flowing into the cells thereof during the in-mold molding is condensed in the cells so that the inside of the cells has a negative pressure. As a consequence, the molded article is apt to shrink and deform. To cope with this problem, the molded article released from the mold is generally subjected to an aging step in which the molded article is allowed to stand in a high temperature atmosphere of, for example, 60° C. to 80° C. to recover the shape of the molded article.

If, in the in-mold molding method for producing the polypropylene-based resin expanded beads molded article, such an aging step is able to be omitted, the production efficiency of the molded article will be significantly improved. Thus, Japanese Unexamined Patent Publication JP2003-39565A discloses a thermoplastic resin expanded beads molded article in which the thermoplastic resin expanded beads each has a foamed core layer and a cover layer covering the foamed core layer. The expanded beads are fusion bonded between their covering layers that are in contact with each other such that gaps or interstices therebetween are maintained as such. JP2003-39565A alleges that no aging step is needed after the in-mold molding process.

Japanese Unexamined Patent Publication JP2000-129028A discloses use of specific polypropylene-based resin expanded beads for in-mold molding of expanded beads molded article. The polypropylene-based resin expanded beads have a specific melting point, a specific melt flow index and a specific Z-average molecular weight. JP2000-129028A alleges that it is possible to shorten the aging time.

SUMMARY OF THE INVENTION

Whilst the technique disclosed in JP2003-39565A may omit the aging step, the appearance and rigidity of the obtained molded article is not satisfactory, since voids remain present between the expanded beads of on the surface of the molded article. The technique described in JP2000-129028A has a problem that the required polypropylene based resin raw material is not easily available.

Further, although the aging time may be shortened, the aging step is still required. When the aging step is omitted, it is difficult to obtain a molded article having a desired shape, because the molded article is apt to shrink and deform.

It is an important objective problem of the present invention to provide polypropylene-based resin expanded beads capable of producing, by in-mold molding, a molded article that has a desired shape and excels in appearance and rigidity even when an aging step is omitted. Another objective problem of the present invention is to provide polypropylene-based resin expanded beads that allows production of molded articles with a reduced molding cycle time and an improved production efficiency.

In accordance with one aspect of the present invention, there are provided:

[1] An expanded bead of a polypropylene-based resin, comprising a through hole, and an inner peripheral surface defining said through hole, characterized in that said through hole has an average hole diameter d of 1 mm or less, said expanded bead has a closed cell content of 85% or more and an average cell diameter La of 50 μm or more and 300 μm or less, said expanded bead has an inner surface portion that extends along the inner peripheral surface to a depth of 300 μm from the inner peripheral surface and that has an average cell diameter Li of 5 μm or more and 150 μm or less, wherein the average cell diameter Li of the inner surface portion is smaller than the average cell diameter La of the expanded bead.

[2] The expanded bead according to above [1], wherein the average cell diameter Li of the inner surface portion is 30 μm or more and 100 μm or less.

[3] The expanded bead according to above [1] or [2], wherein a ratio Li/La of the average cell diameter Li of the inner surface portion to the average cell diameter La of the expanded bead is 0.65 or less.

[4] The expanded bead according to any one of above [1] to [3], wherein a ratio d/D of the average hole diameter d to an average outer diameter D is 0.4 or less.

[5] The expanded bead according to any one of above [1] to [3], wherein the expanded bead has an average thickness t of 1 mm or more and 2 mm or less, wherein the average thickness t is defined as (D-d)/2 where D is an average outer diameter and d is the average hole diameter.

[6] The expanded bead according to above [5], wherein a ratio t/D of the average thickness t to the average outer diameter D is 0.35 or more and 0.5 or less.

[7] The expanded bead according to any one of above [1] to [6], wherein the expanded bead has an apparent density of 10 kg/m³ or more and 150 kg/m³ or less.

[8] The expanded bead according to any one of above [1] to [7], wherein the expanded bead has a cover layer that comprises a polyolefin-based resin and that forms at least part of an outer peripheral surface of the expanded bead.

[9] The expanded bead according to above [8], wherein a mass ratio of the resin constituting the foamed core layer to the resin composing the cover layer is 99.5:0.5 to 80:20, and wherein the polyolefin-based resin constituting the cover layer has a melting point which is lower than a melting point of the polypropylene-based resin.

In another aspect, the present invention provides:

[10] A molded article comprising a multiplicity of the expanded beads according to any one of above [1] to [9], said multiplicity of the expanded beads being fusion bonded together by being heated in a mold.

The polypropylene-based resin expanded beads of the present invention are capable of forming, by in-mold molding, a molded article having an excellent appearance, rigidity and dimensional stability even when an aging time is shortened or an aging step is omitted. Additionally, the expanded beads permit the molding cycle time to be shorted and, therefore, are capable of improving production efficiency of the molded articles.

BRIEF DESCRIPTION OF THE DRAWINGS

Other objects, features and advantages of the present invention will become apparent from the detailed description of the invention which follows, when considered in the light of the accompanying drawings in which.

DETAILED DESCRIPTION OF THE INVENTION

Figure 1:
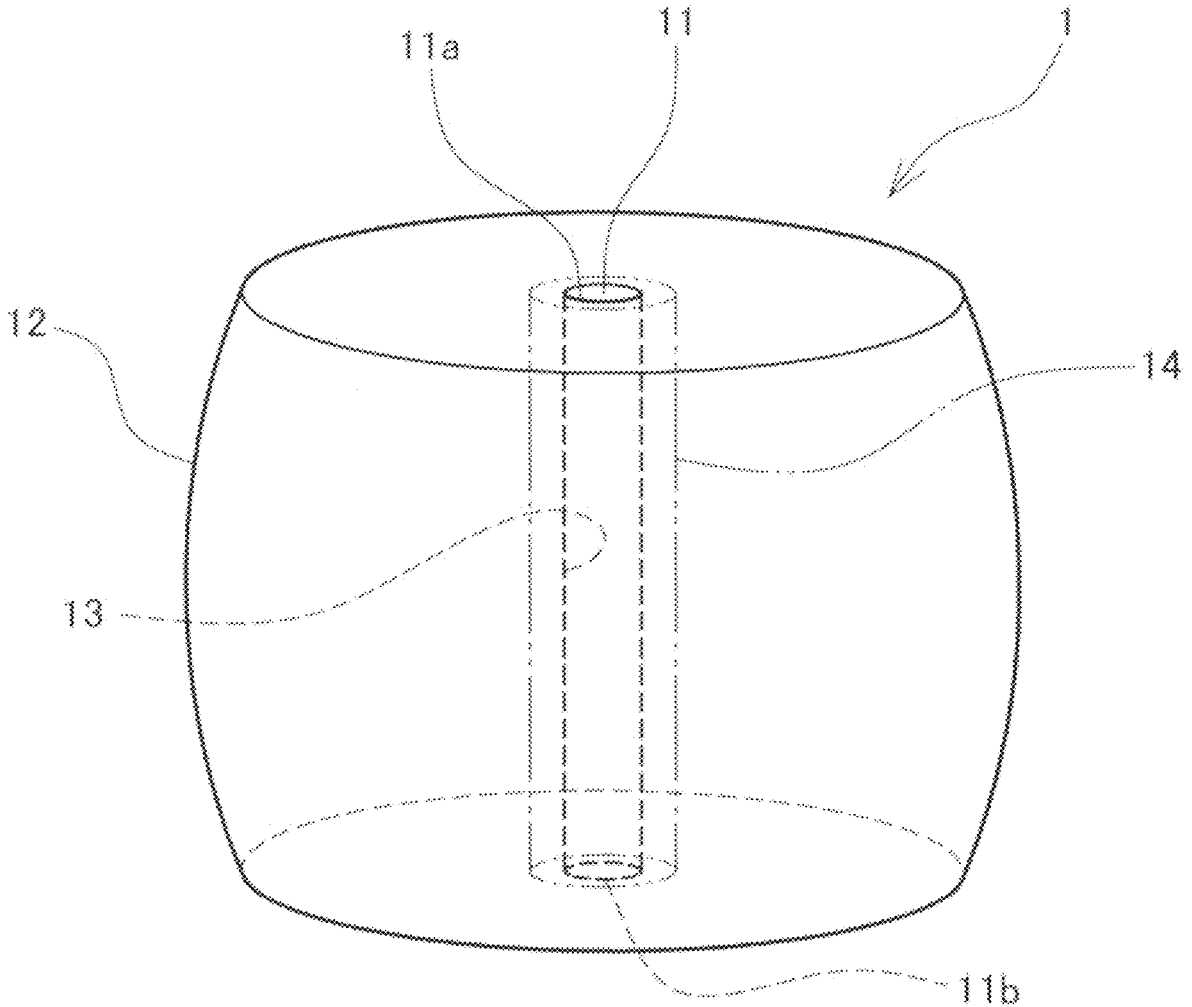
FIG. 1 is a perspective view schematically illustrating a first embodiment of an expanded bead of the present invention.

The polypropylene-based resin expanded beads according to the present invention will be described in detail below.

In the following description, "polypropylene-based resin expanded beads" will be also referred to simply as "expanded beads". In the specification, the term "polypropylene-based resin expanded beads molded article" is intended to refer to a molded article of polypropylene-based resin expanded beads that are fusion-bonded together. In the following description, "polypropylene-based resin expanded beads molded article" will be also referred to simply as "molded article".

In the specification, the singular form (a, an, the) includes the plural form unless the context clearly indicates otherwise. Thus, for example, "an expanded bead" is intended to include "two or more expanded beads". In the present specification, "A to B" representing a numerical range is synonymous with "A or more and B or less". Further, in the specification, the end points (namely, upper and lower limits) of the numerical ranges including sub-ranges are independently combinable with each other; for example, ranges of "A to B, preferably C to D, more preferably E to F" include all intermediate values of the ranges including "A to D, A to F, C to B, C to F, E to B and E to D".

First Embodiment of Expanded Beads

The expanded bead of the first embodiment of the present invention comprises a base resin including a polypropylene-based resin. As used herein, the term "base resin" is intended to refer to any resin or polymeric material capable of forming expanded beads each having a multiplicity of cells. In the present specification, the polypropylene-based resin refers to a homopolymer of a propylene monomer and a propylene copolymer containing 50 mass % or more, preferably 80% by weight or more, more preferably 90% by weight or more of a propylene-derived structural unit. The polypropylene-based resin is preferably a propylene copolymer obtained by copolymerizing propylene with another monomer. Specific examples of the polypropylene-based resin preferably include a copolymer of propylene and an α-olefin having 4 to 10 carbon atoms, such as an ethylene-propylene copolymer, a butene-propylene copolymer, a hexene-propylene copolymer and an ethylene-propylene-butene copolymer. These copolymers may be, for example, random copolymers, block copolymers and are preferably random copolymers. The polypropylene-based resin may be a mixture of plural kinds of polypropylene-based polymers.

Above all, the propylene-based resin is preferably a random copolymer of propylene and a comonomer such as a propylene-ethylene random copolymer and a propylene-ethylene-butene random copolymer. It is also preferred that a content of the comonomer in the random copolymer is 0.5 to 10% by mass based on 100% by mass of the total of the comonomer components and propylene components, since the resulting expanded beads are capable of giving a molded article having excellent rigidity even when a relatively low molding temperature is employed.

From the viewpoint that a molded article with minimized deformation and shrinkage can be obtained even when an aging treatment is omitted, the polypropylene-based resin constituting the expanded bead is preferably a propylene-ethylene random copolymer having an ethylene component content of 0.5% by mass or more and less than 2.0% by mass. From the viewpoint of improving the moldability of the expanded beads and capability of obtaining a molded article having an excellent energy absorbing property, on the other hand, the polypropylene-based resin is preferably a propylene-ethylene random copolymer having an ethylene component content of more than 2% by mass and less than 4.5% by mass, more preferably 2.5 to 4.0% by mass, still more preferably 2.8 to 3.5% by mass.

The content of the comonomer components in the copolymer may be determined by measurement of IR spectrum thereof, which is well known in the art. As used herein, the propylene component and comonomer component refer to a structural unit derived from propylene and a structural unit derived from the comonomer, respectively, in the copolymer of propylene and the comonomer. The contents of such monomer and comonomer components in the copolymer mean the contents of structural units derived from the monomer and comonomer in the copolymer.

The base resin constituting the expanded beads of the present invention may contain a polymer other than the propylene-based resin as long as the effects of the present invention are not adversely affected. Examples of the other polymer include thermoplastic resins other than polypropylene-based resins, such as polyethylene-based resins and polystyrene-based resins, and thermoplastic elastomers. The content of the other polymer in the base resin of the expanded beads is preferably 20 mass % or less, more preferably 10% by mass or less, still more preferably 5% mass or less, particularly preferably 0. That is, the base resin of the expanded beads contains the polypropylene-based resin in an amount of preferably 80% by mass or more, more preferably 90% by mass or more, still more preferably 95% mass or more, particularly preferably 100% by mass.

It is preferred that the polypropylene-based resin has a melting point Tmc of 155° C. or lower, more preferably 153° C. or lower, for reasons that a molded article having excellent appearance and rigidity is obtainable even at a low molding heating temperature (that is, a low molding pressure). From the viewpoint of improving the heat resistance and mechanical strength of the molded article, on the other hand, the melting point Tmc of the polypropylene-based resin is preferably 135° C. or higher, more preferably 138° C. or higher, still more preferably 140° C. or higher.

The melting point Tmc of the polypropylene-based resin may be determined by differential scanning calorimetry (DSC) in accordance with JIS K 7121(1987). Specifically, a polypropylene-based resin sample is first subjected to a conditioning treatment with use of "(2) when the melting temperature is measured after a certain heat treatment" and then heated from 30° C. to 200° C. at a heating rate of 10° C./min to obtain a DSC curve. The melting point is a peak top temperature of the melting peak thereof. When a plurality of melting peaks appear in the DSC curve, the peak top temperature of the melting peak having the largest area is taken as the melting point.

The polypropylene-based resin preferably has a melt flow rate (MFR) of 5 g/10 min or more, more preferably 6 g/10 min or more, still more preferably 7 g/10 min or more, from the viewpoint of improving expandability and moldability of the expanded beads. From the viewpoint of improving the rigidity of the molded article, the MFR is preferably 12 g/10 min or less, more preferably 10 g/10 min or less. The MFR of the polypropylene-based resin is a melt mass flow rate as measured under the conditions involving a test temperature of 230° C. and a load of 2.16 kg in accordance with JIS K7210-1(2014).

The polypropylene-based resin preferably has a flexural modulus of 800 MPa or more, more preferably 850 MPa or more, still more preferably 900 MPa or more, from the viewpoint of improving the rigidity of the molded article and suppressing dimensional variation of the molded article when the aging step is omitted. From the standpoint of capability of obtaining a molded article having excellent appearance, rigidity and energy absorbing property at a low molding temperature, on the other hand, the flexural modulus of the polypropylene-based resin is preferably 1,200 MPa or less, more preferably 1,100 MPa or less, still more preferably 1,000 MPa or less. The flexural modulus of the polypropylene-based resin may be determined in accordance with JIS K7171(2008).

With the conventional technique, a molded article is apt to significantly shrink and deform when expanded beads of a polypropylene-based resin with a flexural modulus of less than 1,200 MPa are subjected to in-mold molding in which no aging treatment is conducted, because resistance of the molded article to shrinkage and deformation is insufficient. With the polypropylene-based resin expanded beads of the present invention, in contrast, an aging step can be omitted even when the polypropylene-based resin has a flexural modulus of less than 1,200 MPa.

Description will be next made of a shape (or geometry) and a cell structure of the expanded bead of the present invention. The expanded bead has any conventionally known broad class of shapes including, for example, spheres, columns, ellipses, circular cylinders, prisms, cubes, cuboids, cones, pyramids, truncated cones and truncated pyramids with a through hole formed therein. Angular edges, corners and ridges of the above shapes are generally rounded. From the standpoint of easiness in production, generally spherical, prismatic, columnar or cylindrical shape is preferred.

The expanded bead has one or more through holes. When expanded beads having no through holes are in-mold molded without an aging step, the obtained molded article is liable to considerably shrink and deform. Because of easiness in production, it is preferred that the expanded bead is provided with only one through hole. It is also preferred that the expanded bead has a cylindrical shape and has a through hole extending in the axial direction.

The expanded beads of the present invention, each of which has a through hole and has a specific cell structure described hereinafter, make it possible to produce a molded article having a desired shape, excellent appearance and rigidity, even when an aging step is omitted or even when an aging time and/or an aging temperature is significantly reduced. Specifically, by allowing the molded article released from a mold to stand in an environment at room temperature (e.g., 23° C.) for an appropriate period (e.g., 12 hours), the shape of the molded article is stabilized.

An example of the expanded bead of the first embodiment is schematically illustrated in FIG. 1. The expanded bead 1 is of a generally circular hollow cylindrical shape and has an outer peripheral surface 12 and an inner peripheral surface 13. The inner peripheral surface 13 defines a through hole 11 extending between top and bottom openings 11a and 11b of the expanded bead 1. The expanded bead 1 has an inner surface portion 14 shown by the phantom line. The inner surface portion 14 extends along the inner peripheral surface 13 to a depth of 300 μm from the inner peripheral surface 13.

The through holes of the expanded beads serve as flow passages for a heating medium such as steam during in mold-molding of the expanded beads to produce a molded article. Namely, the heating medium flows not only between gaps of the expanded beads but also through the through holes thereof and more easily heats the whole expanded beads. Thus, the heating efficiency of the heating medium is improved and, hence, the heating time, temperature and flow rate of the heating medium may be reduced. This contributes to a reduction of molding cycle time, omission of an aging step and improvement of the production efficiency. As used herein, "molding cycle time" refers to a period of time required for one cycle of in-mold molding process, generally from the start of feeding expanded beads to the mold until release of the molded product from the mold.

It is important that the through holes of the expanded beads have an average hole diameter d of 1 mm or less. When the average hole diameter d is excessively large, the appearance and the rigidity of a molded article obtained therefrom may be deteriorated because the through holes remain unclosed. The average hole diameter d of the expanded beads is preferably 0.9 mm or less, more preferably 0.8 mm or less, still more preferably 0.7 mm or less, from the viewpoint that a molded article having a desired shape and excellent appearance and rigidity is obtainable even when an aging step is omitted. From the viewpoint of surely suppressing shrinkage and deformation of the molded article in the case of omitting an aging step, on the other hand, the average hole diameter d of the expanded beads is preferably 0.1 mm or more, more preferably 0.2 mm or more. All the upper and lower limits of the average hole diameter d disclosed herein may be combined to define preferred ranges. Thus, for example, the hole diameters of 0.1 to 1 mm, 0.2 to 1 mm, 0.1 to 0.9 mm, 0.2 to 0.8 mm and 0.2 to 0.7 mm are preferred ranges of the hole diameter d of the through holes of the expanded beads.

The expanded beads having small diameter through holes make it possible to produce an expanded beads molded article having substantially no shrinkage and deformation, even when an aging step is omitted. The reason for this is considered to be as follows. The molded article produced from the expanded beads of the present invention by in-mold molding tends to be formed with minute voids or gaps which are in communication with the outside atmosphere. As a result, as soon as the molded article is released from a mold, air can flow into the cells located deep in the molded article to increase the inside pressure of the whole molded article and, hence, the dimension of the molded article is stabilized early. Further, during the in-mold molding step, a heating medium such as steam easily flows between and into the expanded beads to thereby enable to perform the molding at a lower steam pressure. It is considered that as a consequence of the above phenomena in combination, a good molded article free of shrinkage and deformation can be produced, even when an aging treatment is not conducted.

The above-mentioned minute voids formed in the molded article are considered to be formed from intercommunicated interstices between the expanded beads, intercommunicated through holes that have not completely closed, combination of through holes of and interstices between the expanded beads, open cells formed by destruction of closed cells in inner surface portions of the expanded beads, etc.

The average hole diameter d of the through holes of the expanded beads may be adjusted, for example, by controlling the hole diameter dr of resin particles (described hereinafter) from which the expanded beads are produced, by controlling the apparent density and/or heat of fusion of high temperature peak of the expanded beads. It is also possible to reduce the average hole diameter d by subjecting the expanded beads to two step expansion.

The average hole diameter d of the through holes of the expanded beads is determined as follows. First, an expanded bead is cut perpendicular to the penetrating direction of the through hole at a position where the area of the cut surface is maximum. A photograph of the obtained cut surface of the expanded bead is taken. The area of the through hole portion in the photograph (that is, the cross-sectional area of the through hole) is determined. The diameter of a virtual perfect circle having the same area as the determined area is calculated. The calculated value represents the hole diameter of the through hole of the expanded bead. The above measurement is performed on 100 expanded beads, and the arithmetic mean value of the hole diameters is taken as the average hole diameter d of the expanded beads.

When it is difficult to determine a position where the area of the cut surface is maximum, the following alternative method may be used. An expanded bead is cut perpendicular to the penetrating direction of the through hole into quarters. A cut surface having the maximum area among the obtained cut surfaces is selected as a measurement sample for the above-described determination of the average hole diameter d.

It is also important that an average cell diameter La of the expanded bead should be 50 µm or more and 300 µm or less in order for the expanded bead to exhibit excellent secondary expansion efficiency, appropriate resistance to the heat during the in-mold molding and excellent in-mold moldability and to thereby give a molded article having excellent mechanical properties. For these reasons, the average cell diameter La of the expanded bead is preferably 80 to 280 µm, more preferably 100 to 250 µm. All upper limits and lower limits disclosed herein may be combined to form preferred ranges. Thus, for example, average cell diameters of 50 to 280 µm, 50 to 250 µm, 80 to 300 µm, 80 to 250 µm, 100 to 300 µm and 100 to 280 µm are preferred ranges of the average cell diameter La of the expanded bead.

The average cell diameter La of the expanded beads is measured as follows. An expanded bead is cut perpendicular to the penetrating direction of the through hole at a position where the area of the cut surface is maximum. The cross-section is photographed with a microscope. On the obtained photograph, eight angularly equally spaced straight line segments (i.e., 45 degrees apart) extending radially from the approximate center of the through hole toward the outer peripheral surface of the expanded bead are drawn. Then, a number (Nx) of the cells that intersect the eight line segments is counted. Also measured is a total length (Lx) of those portions of the eight line segments which intersect the cells. The value obtained by dividing the total length by the number of the cells (Lx/Nx) is defined as the average cell diameter of the expanded bead. Similar procedures are repeated for 50 expanded beads in total. The arithmetic mean of the average cell diameters of the 50 expanded beads is defined as the average cell diameter La of the expanded bead.

It is further important that the inner surface portion (designated as 14 in FIG. 1) of the expanded bead should have an average cell diameter Li of 5 to 150 µm and that the average cell diameter Li of the inner surface portion should be smaller than the average cell diameter La of the expanded bead in order that a molded article produced from the expanded beads has a good appearance, an improved rigidity and a significantly reduced shrinkage or deformation, even when an aging step is omitted. Although the reason for such an improvement of appearance and rigidity of the molded article is not clear, it is inferred that the specific small average cell diameter Li of the inner surface portion, which is smaller than the average cell diameter La of the expanded beads, facilitates closure of one or both openings (designated as 11a and 11b in FIG. 1) of the through holes as soon as the molded article has been produced and, hence, surface roughness or unevenness of the molded article attributed to the through holes is decreased (that is, appearance of the molded article is improved) and, further, reduction of the rigidity and cushioning property (impact energy absorbing property) thereof is suppressed.

From the above viewpoint, the average cell diameter Li is preferably 100 µm or less, more preferably 80 µm or less. On the other hand, from the view point that breakage of the cells is suppressed, the average cell diameter Li is preferably 10 µm or more, more preferably 30 µm or more. All upper limits and lower limits disclosed herein may be combined to form preferred ranges. Thus, for example, average cell diameters of 5 to 100 µm, 5 to 80 µm, 10 to 100 µm, 30 to 100 µm and 30 to 80 µm are preferred ranges of the average cell diameter Li.

When the average cell diameter Li of the inner surface portion is not smaller than the average cell diameter La of the expanded bead, there is a possibility that the above effects, namely the effect of achieving excellent appearance of the molded article, the effect of improvement in rigidity of the molded article and the effect of suppressing considerable shrinkage and deformation of the molded article even when an aging step is omitted, are not sufficiently obtained.

Hitherto, in an in-mold molding process using expanded beads having through holes, the obtained molded article has a large number of surface gaps attributed to the through holes, which causes deterioration of the appearance and mechanical properties such as compressive strength thereof. These problems have been solved by using the expanded beads of the present invention which have a specific, small through hole diameter d and a specific inner surface portion having a relatively small average cell diameter Li.

The average cell diameter Li of the inner surface portion (designated as 14 in FIG. 1) of the expanded beads is measured as follows. An expanded bead is cut perpendicular to the penetrating direction of the through hole at a position where the area of the cut surface is maximum. The cross-section is photographed with a microscope. On the obtained photograph, eight angularly equally spaced straight line segments (i.e., 45 degrees apart) extending radially from the approximate center of the through hole toward the outer peripheral surface of the expanded bead are drawn. Then, a number (Ny) of the cells that are present in the inner surface portion and that intersect the eight line segments is counted. Also measured is a total length (Ly) of those portions of the eight line segments that intersect the cells located in the inner surface portion. The total length Ly is nearly equal to 2,400 $\mu$m (8×300 $\mu$m). The value obtained by dividing the total length (Ly) by the measured number (Ny) of the cells (Ly/Ny) is defined as the average cell diameter of the expanded bead. Similar procedures are repeated for 50 expanded beads in total. The arithmetic mean of the average cell diameters of the 50 expanded beads is defined as the average cell diameter Li of the inner surface portion of the expanded bead.

The expanded beads having the above specific average cell diameter Li of the inner surface portion thereof may be produced by, for example, using a specific die in the production of resin particles (described hereinafter) from which the expanded beads are produced.

It is preferred that a ratio Li/La of the average cell diameter Li of the inner surface portion to the average cell diameter La of the expanded bead is 0.65 or less, since the in-mold moldability of the expanded beads is improved and since the appearance and rigidity of the molded article is more improved even when the aging step is omitted or shortened. The Li/La ratio is more preferably 0.6 or less, still more preferably 0.55 or less, while the lower limit of the Li/La ratio is more preferably 0.2, still more preferably 0.4. All upper limits and lower limits disclosed herein may be combined to form preferred ranges. Thus, for example, Li/La ratios of 0.2-0.65, 0.2 to 0.6, 0.2 to 0.55, 0.4 to 0.65 and 0.4 to 0.55 are all preferred ranges of Li/La.

It is further important that the expanded bead has a closed cell content of 85% or more, more preferably 92% or more, still more preferably 95% or more, in order to ensure good in-mold moldability of the expanded beads and to improve the appearance and rigidity of the molded article obtained therefrom.

As used herein, the closed cell content of the expanded beads is measured as follows. The expanded beads are allowed to stand for 10 days for aging in a thermostatic chamber at 23° C. under atmospheric pressure and a relative humidity of 50%. In the same thermostatic chamber, about 20 cm$^3$ bulk volume of the expanded beads thus aged are sampled and measured for the precise apparent volume Va by a ethanol immersion method described below. The sample beads whose apparent volume Va has been measured are fully dried and measured for their true volume Vx according to Procedure C of ASTM D-2856-70 using an air comparison pycnometer. From the volumes Va and Vx, the closed cell content is calculated by the formula shown below. The average of five samples (N=5) is the closed cell content of the expanded beads.

$$\text{Closed cell content } (\%)=(Vx-W/\rho)\times100/(Va-W/\rho)$$

In the above formula, Vx represents the true volume (cm$^3$) of the expanded beads measured by the above method, which corresponds to a sum of a volume of the resin constituting the expanded beads and a total volume of all the closed cells in the expanded beads, Va represents an apparent volume (cm$^3$) of the expanded beads, which is measured by a rise of the liquid level when the expanded beads are immersed in ethanol contained in a measuring cylinder, W is a weight (g) of the sample expanded beads used for the measurement, and $\rho$ is a density (g/cm$^3$) of the resin constituting the expanded beads.

It is preferred that an average outer diameter D of the expanded beads is 2 mm or more, more preferably 2.5 mm or more, still more preferably 3 mm or more, from the viewpoint that the secondary expansion efficiency of the expanded beads and the rigidity of the molded article are improved. On the other hand, the average outer diameter D is preferably 5 mm or less, more preferably 4.5 mm or less, still more preferably 4.3 mm or less, from the viewpoint of improving the filling efficiency thereof into a mold cavity at the time of in-mold molding.

It is also preferred that a ratio d/D of the average hole diameter d to the average outer diameter D of the expanded beads is 0.4 or less, more preferably 0.3 or less, still more preferably 0.25 or less. The ratio d/D is preferably 0.1 or more. When the ratio d/D is within the above range, the wall thickness of the generally hollow cylindrical expanded beads is appropriate to attain good secondary expansion efficiency of the expanded beads and, additionally, the appearance and rigidity of the molded article produced therefrom is excellent. All upper limits and lower limits disclosed herein may be combined to form preferred ranges. Thus, for example, d/D ratios of 0.1 to 0.4, 0.1 to 0.3 and 0.1 to 0.25 are preferred d/D ranges.

The average outer diameter D of the expanded beads is determined as follows. An expanded bead is cut perpendicular to the penetrating direction of the through hole at a position where the area of the cut surface is maximum. A photograph of the obtained cut surface of the expanded bead is taken. The cross-sectional area of the expanded bead (including the cross-sectional area of the through hole) is determined. The diameter of a virtual perfect circle having the same area as the determined area is calculated. The calculated value represents the outer diameter of the expanded bead. The above measurement is performed on 100 expanded beads, and the arithmetic mean value of the outer diameters is taken as the average outer diameter D of the expanded beads.

It is also preferred that an average thickness t of the expanded beads is 1 to 2 mm. The thickness of the expanded bead is a distance between the outer peripheral surface 12 and the inner peripheral surface 13 (reference should be made to FIG. 1). When the average thickness t is within the above range, the wall thickness of the expanded beads is sufficiently thick, so that the secondary expansion efficiency at the time of in-mold molding is further improved. Additionally, the expanded beads are less prone to be crushed when subjected to an external force and, hence, the rigidity of the molded article is further improved. From these viewpoints, the average wall thickness t of the expanded beads is more preferably 1.1 to 2 mm.

The average wall thickness t of the expanded beads is determined by the following formula:

$$t=(D-d)/2$$

where d represents an average hole diameter (mm) of the through holes of the expanded beads and D represents an average outer diameter (mm) of the expanded beads.

It is preferred that a ratio t/D of the average wall thickness t to the average outer diameter D of the expanded beads is preferably 0.35 to 0.5, since the filling efficiency of the expanded beads into a mold cavity and the secondary expansion efficiency at the time of in-mold molding are improved and, hence, a molded article having excellent appearance and rigidity may be produced at a lower molding heating temperature.

It is also preferred that an apparent density of the expanded beads is 10 to 150 kg/m³, more preferably 15 to 100 kg/m³, still more preferably 20 to 80 kg/m³, particularly preferably 25 to 60 kg/m³, from the viewpoint of a balance between a lightweight property and rigidity of the molded article obtained therefrom. All upper limits and lower limits disclosed herein may be combined to form preferred ranges. Thus, for example, apparent densities of 10 to 100 kg/m³, 10 to 60 kg/m³, 15 to 100 kg/m³, 15 to 80 kg/m³, 20 to 100 kg/m³, 20 to 60 kg/m³, 25 to 100 kg/m³ and 25 to 80 kg/m³ are preferred apparent density ranges.

Hitherto, it has been difficult to omit an aging step in the production of a molded article using expanded beads having a small apparent density, because the molded article is significantly deformed after demolding. In the case of the present invention, on the other hand, such an aging step is able to be omitted in in-molding molding of the expanded beads having a small apparent density. Namely, a molded article having little dimensional change, excellent rigidity and excellent appearance is obtainable even without an aging step.

The apparent density of the expanded beads may be determined as follows. In an alcohol (such as ethanol) at 23° C. contained in a measuring cylinder, an amount of expanded beads having a weight (W), which have been allowed to stand for 1 day under the conditions of a relative humidity of 50%, 23° C. and 1 atm, are immersed using a wire mesh. From an increase in the liquid level in the measuring cylinder, a volume V of the immersed expanded beads is read. By dividing the weight W by the volume V (W/V), the apparent density of the expanded beads is obtained with appropriate unit conversion into [kg/m³] being made.

It is further preferred that a ratio of the apparent density of the expanded beads to the bulk density of the expanded beads (apparent density/bulk density) is 1.7 or more from the viewpoints of further suppressing the shrinkage and deformation of a molded article obtained therefrom without an aging treatment. The ratio (apparent density/bulk density) is preferably 2.1 or less, more preferably 2.0 or less, still more preferably 1.9 or less from the viewpoint of improving the rigidity and the appearance of the molded article.

The bulk density of the expanded beads is determined as follows. Expanded beads are randomly selected and placed in a graduated cylinder with a volume of 1 L up to the 1 L scale thereof in a natural sedimentation state. The bulk density of the expanded beads is obtained by dividing the mass W2 [g] of the expanded beads placed in the graduated cylinder by the volume V2 [L] (1,000 cm³) thereof (W2/V2), followed by unit conversion to [kg/m³].

It is also preferred that the expanded beads have a specific crystal structure that shows a first time DSC curve having an intrinsic melting peak which is intrinsic to the base resin and a high temperature melting peak which is located on a higher temperature side of the intrinsic melting peak, when the expanded beads are measured by heat flux differential scanning calorimetry in which a sample thereof is heated from 23° C. to 200° C. at a heating rate of 10° C./min. The first time DSC curve is measured in accordance with JIS K7121 (2012) using 1 to 3 mg of the expanded bead or beads as a measuring sample.

The intrinsic melting peak is an endothermic peak which is considered to be ascribed to the melting of crystals originally contained in the polypropylene-based resin. The high temperature peak, on the other hand, is an endothermic peak which is considered to be ascribed to the melting of crystals secondarily formed in the past thermal history of the polypropylene-based resin. The high temperature peak is observed in the first time DSC curve obtained in the heating of the sample of expanded beads from 23° C. to 200° C. at 10° C./min as described above, but does not appear in the second time DSC curve which is obtained by subsequently lowering, after the first time DSC measurement, the temperature from 200° C. to 23° C. at 10° C./min and again raising the temperature to 200° C. at 10° C./min. Therefore, whether or not a high temperature peak exists in the first time DSC curve may be easily determined by performing the second DSC measurement following the first DSC measurement to obtain the second time DSC curve. That is, the endothermic peak in the first time DSC curve that appears in the first time DSC curve but does not exist in the second time DSC curve is recognized as a high temperature peak. The peak top temperature of the intrinsic peak in the first time DSC curve may differ from that in the second time DSC curve within a range of ±5° C.

It is preferred that the heat of fusion (ΔHh) of the high temperature peak is 5 to 40 J/g, more preferably 7 to 30 J/g, still more preferably 10 to 20 J/g, since the moldability of the expanded beads is improved and a molded article obtained therefrom is improved.

It is also preferred that a ratio of the heat of fusion of the high temperature peak (ΔHh) to a total heat of fusion of all fusion peaks (ΔHt) is 0.05 to 0.3, more preferably 0.1 to 0.28, still more preferably 0.15 to 0.25, since the physical strength of the expanded beads is excellent owing to the presence of the secondary crystals and since the in-mold moldability of the expanded beads is also excellent. The total heat of fusion of the expanded beads is a sum of the heat of fusion of all melting peaks in the first time DSC curve.

Figure 5:
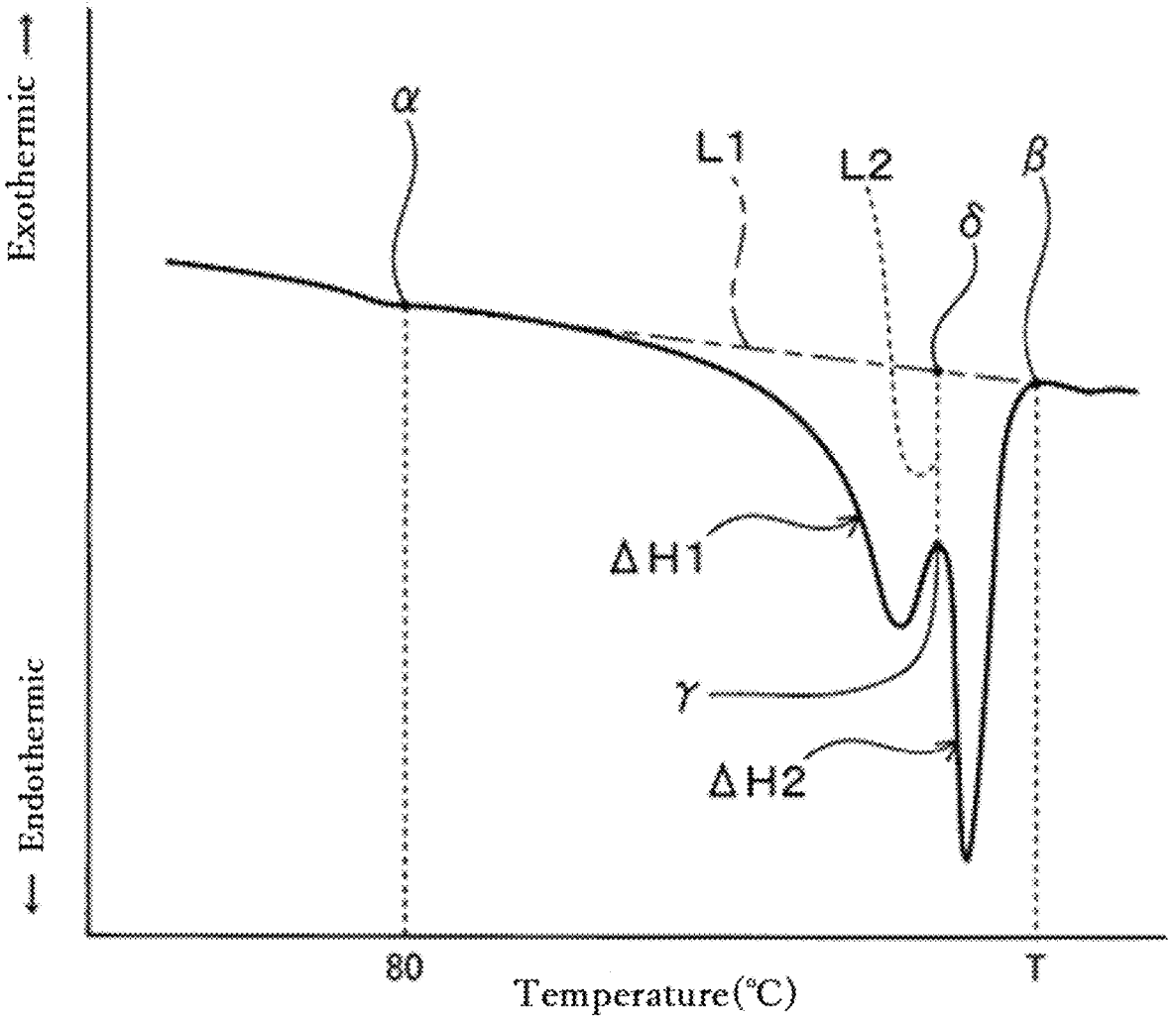
FIG. 5 is a schematic diagram showing an example of a DSC curve obtained in the heat flux differential scanning calorimetry of the expanded beads of the present invention.

The heat of fusion (calorific value) of the melting peaks in the first time DSC curve is determined as follows. First, an expanded bead is sampled and subjected to DSC measurement using a heat flux differential scanning calorimeter (such as a DSC measurement device manufactured by SII NanoTechnology Inc., model number: DSC7020) in which the temperature is raised from 23° C. to 200° C. at 10° C./min to obtain a first time DSC curve. An example of such a DSC curve is shown in FIG. 5. Designated as ΔH1 in FIG. 5 is the intrinsic peak and as ΔH2 is the higher temperature peak. On the DSC curve, a straight line L1 connecting a point α at 80° C. and a point β at a melting end temperature T of the expanded beads is drawn. The melting end temperature T is an intersection at which the DSC curve on a high temperature side of the high temperature peak ΔH2 meets the base line. Next, a line L2 which is parallel with the ordinate and which passes through a point γ on the DSC curve at the bottom of the valley between the intrinsic peak ΔH1 and the high temperature peak ΔH2 is drawn. The point at which the line L2 crosses the line L1 is designated as δ. The point γ may be said to be the maximum point on the DSC curve between the intrinsic peak ΔH2 and the high temperature peak ΔH2.

The area of the intrinsic peak ΔH1 is the area bounded by the curve of the intrinsic peak ΔH1, the line segment (α-δ) and the line segment (γ-δ), and corresponds to the heat of fusion of the intrinsic peak ΔH1. The area of the high temperature peak ΔH2 is the area bounded by the curve of the high temperature peak ΔH2, the line segment (δ-β) and the line segment (γ-δ), and corresponds to the heat of fusion (ΔHh) of the high temperature peak ΔH2. The total area of all fusion peaks is the area bounded by the intrinsic peak $\Delta H1$, the high temperature peak $\Delta H2$ and the line segment $(\alpha-\beta)$, and corresponds to the heat of fusion $(\Delta Ht)$ of all fusion peaks.

The molded article of the present invention may be produced from the above-described expanded beads by any known in-mold molding process and has excellent appearance, rigidity and dimensional stability and is minimized shrinkage and deformation even when an aging step is omitted. Although not wishing to be bound by the theory, such effects are considered to be attained by the following mechanism. The molded article has minute voids that are in fluid communication with the outside thereof. Such voids include interstices between the expanded beads, through holes thereof which remain unclosed and open cells formed as a result of breakage of the cells in the inner surface portion. At least some of such interstices, through holes and open cells are intercommunicated with each other. Because of the above structure of the expanded beads, outside air is able to flow into the molded article as soon as it has been produced. As a consequence, an inside pressure in the molded article as a whole is increased and, hence, the dimension thereof is stabilized within a short period of time. It is considered that, for the above reasons, shrinkage and deformation of the molded article is greatly suppressed without performing an aging step.

Second Embodiment of Expanded Bead

Figure 2:
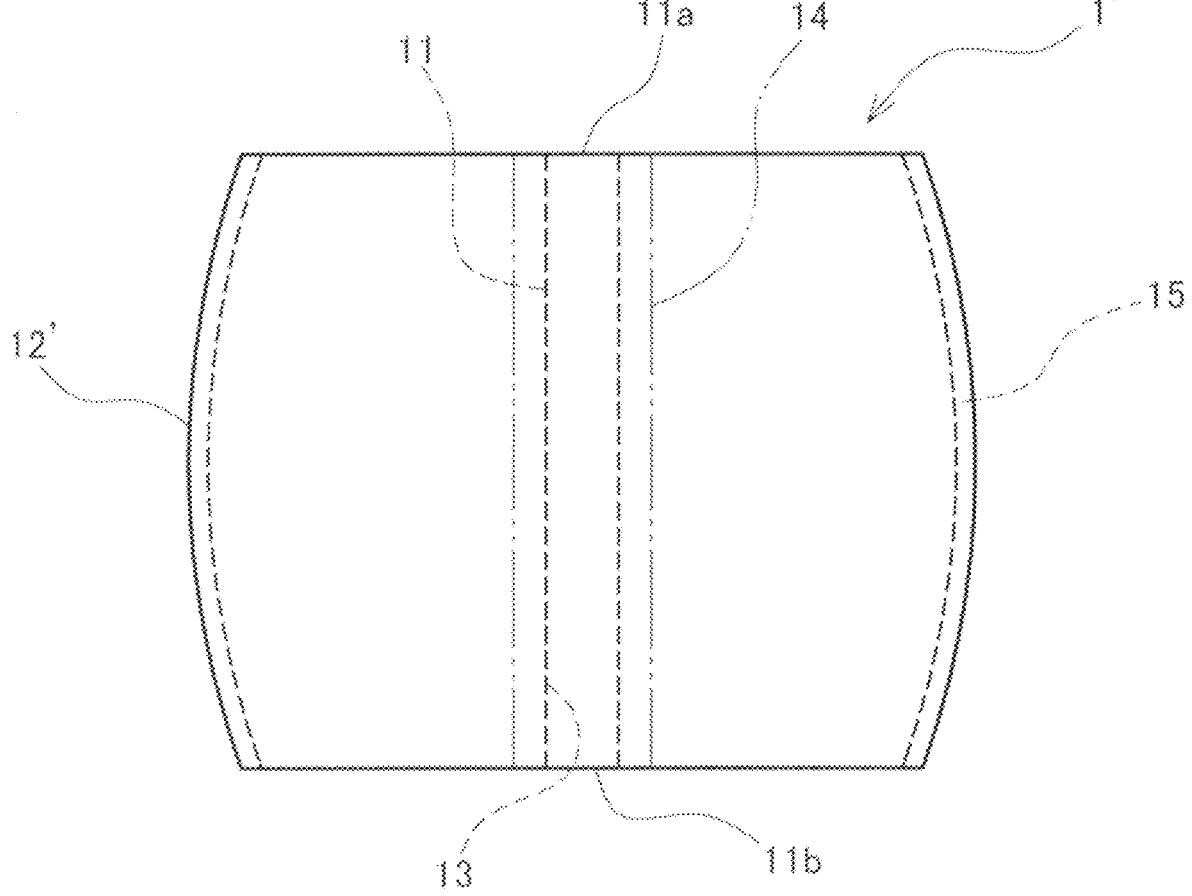
FIG. 2 is a side view schematically illustrating a second embodiment of an expanded bead of the present invention.

Referring to FIG. 2, designated generally as 1' is an expanded bead of the second embodiment according to the present invention. The expanded bead 1' has a cover layer 15 that comprises a resin, preferably a polyolefin-based resin, and that forms at least part of an outer peripheral surface 12' of the expanded bead 1'. The expanded bead 1' of the second embodiment may be said to be a multilayer expanded bead which includes a foamed core layer that is the expanded bead 1 (see FIG. 1) of the first embodiment (in particular, the expanded bead 1), and a cover layer 15 that covers at least part of an outer peripheral surface 12 (see FIG. 1) of the foamed core layer. Thus, the expanded bead 1' of the second embodiment is the same as the expanded bead 1 of the first embodiment except that the former expanded bead is provided with the cover layer 15. The composition, physical properties, structure, constitution, etc. described in the foregoing with regard to the first embodiment of the expanded bead also apply to the foamed core layer of the expanded bead of the second embodiment. In the following description, the term "expanded beads" is intended to also include "multilayer expanded beads", unless the context clearly indicates otherwise.

The resin of the cover layer is preferably a polyolefin-based resin. From the viewpoint of adhesion efficiency between the cover layer and foamed core layer, the polyolefin-based resin is preferably a polypropylene-based resin, a polyethylene-based resin, and a mixture thereof, and a polypropylene-based resin is particularly preferred. Examples of the polypropylene-based resin include a propylene-ethylene copolymer, a propylene-butene copolymer, a propylene-ethylene-butene copolymer and a propylene homopolymer. Above all, a propylene-ethylene copolymer and a propylene-ethylene-butene copolymer are particularly preferred.

It is preferred that the polyolefin-based resin constituting the cover layer has the melting point Tms which is lower than the melting point Tmc of the polypropylene-based resin constituting the foamed core layer, since the fusion-bonding efficiency between the multilayer expanded beads is improved and, hence, it is possible to carry out in-mold molding process using a heating medium, such as steam, having a reduced temperature. This also enables to suppress shrinkage and deformation of the molded article even when an aging step is omitted. The reason for this is probably because the use of reduced temperature steam prevents the multilayer expanded beads from being heated excessively during the in-mold molding process and, therefore, allows the dimension of the molded article to be stabilized within a shorter period of time.

From the viewpoint of improving the fusion bonding efficiency between the multilayer expanded beads and lowering the molding heating temperature in the in-mold molding process, it is more preferred that the melting points Tms and Tmc satisfy the relationship $(Tmc-Tms){\geq}3^\circ$ C., more preferably $(Tmc-Tms){\geq}5^\circ$ C., still more preferably $(Tmc-Tms){\geq}8^\circ$ C. On the other hand, from the viewpoint of suppressing peeling between the foamed core layer and the covering layer, the melting points Tms and Tmc preferably satisfy the relationship $(Tmc-Tms){\leq}35^\circ$ C., more preferably $(Tmc-Tms){\leq}20^\circ$ C., still more preferably $(Tmc-Tms){\leq}15^\circ$ C.

The melting point Tms of the polyolefin-based resin constituting the covering layer is preferably 120 to 145° C., more preferably 125 to 140° C. from the viewpoint of improving the fusion bonding efficiency of the multilayer expanded beads. The melting point of the polyolefin-based resin is determined in accordance with JIS K7121(1987) in a manner similar to determination of the melting point Tmc of the polypropylene-based resin described previously.

The polyolefin-based resin constituting the cover layer preferably has MFR which is equal or nearly equal to that of the polypropylene-based resin constituting the foamed core layer. More specifically, the MFR of the polyolefin-based resin is preferably 2 to 15 g/10 min, more preferably 3 to 12 g/10 min, still more preferably 4 to 10 g/10 min, from the viewpoint of reliably suppressing peeling between the foamed core layer and the cover layer. The MFR of the polyolefin-based resin is measured under the conditions involving a temperature of 230° C. and a load of 2.16 kg in accordance with JIS K 7210-1(2014) when the polyolefin-based resin is a polypropylene-based resin. When the polyolefin-based resin is a polyethylene-based resin, the MFR is measured under the conditions involving a temperature of 190° C. and a load of 2.16 kg in accordance with JIS K 7210-1(2014).

The cover layer may be either in an expanded state or an unexpanded state. However, the cover layer is preferably in a substantially non-expanded state in order for the multilayer expanded beads to have excellent fusion-bonding property and to allow a reduction of the molding temperature in an in-mold molding process. The "substantially non-expanded state" herein refers to a state in which almost no cell structure is present, including a case where cells are not present at all and a case where cells once formed have been completely melt-fractured.

In the multilayer expanded bead, the foamed core layer may be partially exposed on the surface of the multilayer expanded bead. Examples of the structure in which the foamed core layer is partially exposed include a structure in which only the side periphery of a cylindrical foamed core layer is covered with the surface layer and the foamed core layer is exposed at the top and bottom of the core layer (as shown in FIG. 2).

The cover layer preferably has a thickness of 0.5 to 100 μm. If desired, an intermediate layer may be additionally provided between the foamed core layer and the cover layer. It is also preferred that a mass ratio of the resin constituting the foamed core layer to the resin composing the cover layer is 99.5:0.5 to 80:20, more preferably 99:1 to 85:15, still more preferably 97:3 to 90:10 from the viewpoint of enhancing the moldability of the multilayer expanded beads while maintaining the rigidity of the molded article obtained therefrom. As used herein, the mass ratio refers to a ratio of the mass % of the resin constituting the foamed core layer to the mass % of the resin constituting the cover layer.

Method of Fabricating Expanded Beads:

The expanded polypropylene resin beads may be produced by a dispersion medium release foaming method which includes providing tubular polypropylene resin particles (or pellets) each having a through hole. The tubular polypropylene resin particles each having a through hole will be hereinafter also simply referred to as "resin particles". The resin particles are dispersed in a dispersing medium such as water in an autoclave to obtain a dispersion. The resin particles in the dispersion are impregnated with a blowing agent to obtain foamable resin particles. The obtained foamable resin particles are released from the autoclave together with the dispersing medium into a lower pressure atmosphere so that the foamable resin particles are foamed and expanded to obtain expanded beads each having a through hole. Preferably, the blowing agent is injected into the dispersion after the dispersion has been heated and, thereafter, the dispersion is maintained at a determined temperature for a period of time sufficient to form and grow secondary crystals of the polypropylene resin and is then released from the autoclave. The above described method is also used for producing multilayer expanded beads each having a cover layer. The resin particles are, however, required to be additionally provided with a cover layer. Namely, the multilayer expanded bead having a through hole is produced from a multilayer resin particle having a through hole.

The resin particles may be prepared by, for example, a method which includes feeding the polypropylene-based resin and, optionally, additives such as a cell controlling agent into an extruder, heating and kneading the feeds in the extruder to obtain a resin melt, extruding the resin melt from a hole of a die attached to a tip of the extruder in the form of tubular strand, and pelletizing the strand with a pelletizer by, for example, a strand cutting method or an under-water cutting method to obtain the resin particles each having a through hole. The die attached to the extruder has a flow passage whose sectional shape corresponds to that of the resin particles.

The resin particles having a cover layer are produced, for example, as follows. A core layer-forming extruder and a cover layer-forming extruder are used. Outlets of both extruders are connected to a coextrusion die. The polypropylene-based resin and, optionally, additives such as a cell controlling agent are melted and kneaded in the core layer-forming extruder, and a resin and an additive used as necessary are melted and kneaded in the cover layer-forming extruder. The respective melt-kneaded materials are fed to the coextrusion die and combined to form a composite melt having a multi-layered structure composed of a core layer and a cover layer covering the outer surface of the core layer. The composite melt is then coextruded from the die through an annular hole thereof into a tubular strand. The strand is cooled and cut with a pelletizer to obtain multilayer resin particles each having a through hole. In the following description, the term "resin particles" is intended to also include "multilayer resin particles", unless the context clearly indicates otherwise.

As described previously, the expanded bead has an inner surface portion having an average cell diameter Li that is 5 to 150 μm and that is smaller than the average cell diameter La of the expanded bead. Such a specific surface portion of the expanded bead is able to be formed from a resin particle which has a through hole and whose inner surface portion is relatively highly oriented in the direction parallel with the penetrating direction of the through hole.

To achieve such molecular orientation, use is made of a die designed to make the tubular strand extruded therethrough oriented in the extrusion direction at its inner surface portion. Because of such molecular orientation, crystallization proceeds in the inner surface portion of the resin particle obtained by cutting the tubular strand. The resin crystallites in the inner surface portion of the resin particle are considered to serve as nuclei for expansion so that the cell diameters in the inner surface portion tend to be small. A preferred example of such a design of the die is the use of a through hole-forming jig (such as a thin rod) having a relatively long length (length from an upstream end thereof to the exit of the extrudate). Although not wishing to be bound by the theory, the orientation mechanism is considered to be as follows. The resin melt moving through the die is brought into moving contact with the peripheral surface of the jig. Since the inner peripheral portion of the melt in contact with the jig undergoes shearing, molecular orientation of the resin is induced during its moving contact with the jig. Thus, when the jig is made longer, orientation will proceed more.

An outer diameter of the resin particle is preferably 0.1 to 3.0 mm, more preferably 0.3 to 1.5 mm. A ratio of the length of the resin particle to the outer diameter thereof (aspect ratio) is preferably 0.5 to 5.0, more preferably 1.0 to 3.0. An average mass per one resin particle (determined from the mass of 200 randomly selected resin particles) is preferably 0.1 to 20 mg, more preferably 0.2 to mg, still more preferably 0.3 to 5 mg, particularly preferably 0.4 to 2 mg. In the case of the multilayer resin particle, it is preferred that a mass ratio of the resin constituting the core layer to the resin composing the cover layer is 99.5:0.5 to more preferably 99:1 to 85:15, still more preferably 97:3 to 90:10. As used herein, the mass ratio refers to a ratio of the mass % of the resin constituting the core layer to the mass % of the resin constituting the cover layer.

The average hole diameter d of the through holes of the expanded beads may be adjusted by controlling a hole diameter dr of the through hole of the resin particle. The hole diameter dr of the through hole may be adjusted by adjusting the outer diameter of the jig (thin roll) provided in the die. The average outer diameter and average wall thickness of the expanded beads may be adjusted to the above desired range by adjusting the outer diameter and average mass of the resin particles.

The average hole diameter dr of the through holes of the resin particles is preferably less than 0.25 mm, more preferably less than 0.24 mm, still more preferably 0.22 mm or less, from the viewpoint that expanded beads having an average hole diameter d of the through holes of 1 mm or less and a ratio d/D of the average hole diameter d to the average outer diameter D of 0.4 or less are able to be produced more reliably. From the viewpoint of the production stability of the resin particles having through holes, the average hole diameter dr of the through holes of the resin particles is preferably 0.1 mm or more.

The ratio dr/Dr of the average hole diameter dr to the average outer diameter Dr of the resin particles is preferably 0.4 or less, more preferably 0.3 or less, still more preferably 0.25 or less, particularly preferably 0.2 or less, for the same reasons as described above in connection with the d/D of the expanded beads. From the viewpoint of the production stability, the ratio dr/Dr is preferably 0.1 or more.

The average hole diameter dr of the through holes of the resin particles is determined as follows. A resin particle is cut perpendicularly to the penetration direction of the through hole at a position where the area of the cut surface is maximum. A photograph of the obtained cut surface of the resin particle is taken. The area of the through hole portion in the photograph (that is, the cross-sectional area of the through hole) is determined. The diameter of a virtual perfect circle having the same area as the determined area is calculated. The calculated value represents the hole diameter of the through hole of the through hole. The above measurement is performed on 50 resin particles, and the arithmetic mean value of the hole diameters is taken as the average hole diameter dr of the resin particle.

The average outer diameter Dr of the resin particles is determined as follows. A resin particle is cut perpendicular to the penetrating direction of the through hole at a position where the area of the cut surface is maximum. A photograph of the obtained cut surface of the resin particle is taken. The cross-sectional area of the resin particle (including the cross-sectional area of the through hole) is determined. The diameter of a virtual perfect circle having the same area as the determined area is calculated. The calculated value represents the outer diameter of the resin particle. The above measurement is performed on 50 resin particles, and the arithmetic mean value of the outer diameters is taken as the average outer diameter Dr of the resin particles.

The particle size, the length/outer diameter ratio and the average mass of the resin particles may be adjusted by appropriately changing the extrusion speed, take-up speed, cutter speed, etc. when the strand cutting method is performed.

If desired, one or more additives such as a cell controlling agent, a crystal nucleating agent, a colorant, a flame retardant, a flame retardant aid, a plasticizer, an antistatic agent, an antioxidant, an ultraviolet inhibitor, a light stabilizer, a conductive filler and an antibacterial agent the resin particle may be incorporated into the resin particles or into the core layer in the case of the multilayer resin particles. Examples of the cell controlling agent include inorganic powders such as talc, mica, zinc borate, calcium carbonate, silica, titanium oxide, gypsum, zeolite, borax, aluminum hydroxide, and carbon; and organic powders such as a phosphate nucleating agent, a phenolic nucleating agent, an amine nucleating agent, and a polyfluoroethylene resin powder. The cell controlling agent may be used in an amount of preferably to 1 parts by mass based on 100 parts by mass of the polypropylene-based resin.

The expanded beads may be produced by expanding the thus obtained resin particles by a dispersion medium release foaming process. In this process, the resin particles are dispersed in an aqueous dispersing medium containing water as a main component. The proportion of water in the aqueous dispersion medium is preferably mass % or more, more preferably 70 mass % or more, still more preferably 80 mass % or more. Examples of the dispersion medium other than water include ethylene glycol, glycerin, methanol and ethanol.

In the dispersion medium release foaming method, it is preferable to add a dispersant to the dispersion medium since the resin particles heated in the closed vessel are prevented from adhering to each other. Any dispersant may be used as long as it is capable of preventing adhesion between the resin particles in the closed vessel. The dispersant may be either an organic or inorganic material, though an inorganic fine powder is preferable for reasons of ease of handling. Specific examples of the dispersant include clay minerals such as amsnite, kaolin, mica, and clay. The clay mineral may be natural or synthetic. Examples of the dispersant include aluminum oxide, titanium oxide, basic magnesium carbonate, basic zinc carbonate, calcium carbonate, iron oxide and a mixture of two or more thereof. Above all, a clay mineral is particularly preferably used. The dispersant is preferably used in an amount of 0.001 to 5 parts by mass per 100 parts by mass of the resin particles.

When a dispersant is used, an anionic surfactant such as sodium dodecylbenzenesulfonate, sodium alkylbenzenesulfonate, sodium lauryl sulfate or sodium oleate is preferably used in combination with the dispersant as a dispersing aid. The addition amount of the dispersing aid is preferably 0.001 to 1 part by mass per 100 parts by mass of the resin particles.

A physical blowing agent is preferably used in the dispersion medium release foaming method. Examples of the physical blowing agent include an inorganic physical blowing agent such as carbon dioxide, air, nitrogen, helium, and argon and an organic physical blowing agent such as an aliphatic hydrocarbon, e.g., propane, butane and hexane, a cyclic aliphatic hydrocarbon, e.g., cyclopentane and cyclohexane and a halogenated hydrocarbon, e.g., chlorofluoromethane, trifluoromethane, 1,1-difluoromethane, 1-chloro-1,1-dichloroethane, 1,2,2-tetrafluoroethane, methyl chloride, ethyl chloride and methylene chloride. The physical blowing agent may be used singly or in combination of two or more thereof. The inorganic physical blowing agent and organic physical blowing agent may be used in combination. From the viewpoint of environmental load and handleability, an inorganic physical blowing agent is preferably used, and carbon dioxide is more preferably used. When an organic physical blowing agent is used, it is preferable to use n-butane, i-butane, n-pentane, or i-pentane from the viewpoint of solubility in the polypropylene-based resin and expandability.

The blowing agent is preferably used in an amount of 0.1 to 30 parts by mass, more preferably 0.5 to 15 parts by mass, based on 100 parts by mass of the resin particles.

Impregnation of the resin particles with the blowing agent is preferably carried out by a method which includes dispersing the resin particles in an aqueous dispersion medium in a closed vessel such as autoclave to obtain a dispersion, injecting the blowing agent into the dispersion while heating the dispersion to impregnate the resin particles with the blowing agent, thereby obtaining expandable resin particles.

The internal pressure of the closed vessel at the time of expansion of the expandable resin particles is preferably 0.5 MPa G (gauge pressure) or more and 4.0 MPa (G) or less, for reasons that expanded beads can be produced safely without the risk of breakage, explosion, or the like of the closed vessel. The dispersion in the closed vessel is preferably heated at a heating rate of 1 to 5° C. per minute so as to appropriately control the expansion temperature.

As describe previously, the expanded beads preferably have a specific crystal structure that shows a first time DSC curve having an intrinsic melting peak and a high temperature melting peak which is located on a higher temperature side of the intrinsic melting peak. Such expanded beads may be obtained as follows. The dispersion of the expandable resin particles in the closed vessel is heat treated at a temperature in the range of (Tm−20° C.) or higher (Tm is the melting point of the polypropylene-based resin) and lower than TmE (TmE is the melting end temperature of the polypropylene-based resin) for about 10 to 60 minutes (first stage heat treatment). Thereafter, the temperature is adjusted at a temperature in the range of Tm−15° C. to TmE+10° C.). If desired, the dispersion is maintained at that temperature for about 10 to 60 minutes (second stage heat treatment). Subsequently, the dispersion is released from the closed vessel to a low pressure atmosphere to foam and expand the expandable resin particles, thereby obtaining expanded beads having the above-described crystal structure. The expansion is preferably performed at a temperature in the closed vessel of (Tm−10° C.) or higher, more preferably (Tm to Tm+20° C.).

The expanded beads obtained in the foregoing production process may be further processed to obtain expanded beads having a particularly low apparent density, if desired. Thus, the expanded beads obtained in the foregoing production process (first stage expansion) are charged in a pressurizable closed vessel, into which a pressurized gas such as air is then injected so that the internal pressure of the expanded beads is increased. The expanded beads are heated in the container using a heating medium such as steam for a predetermined time to obtain expanded beads having a particularly low apparent density (second stage expansion).

Production of Molded Article:

The molded article may be obtained by heating of the expanded beads in a mold to fusion bond the expanded beads together (in-mold molding). In the in-mold molding process, the expanded beads are filled in a mold cavity and heated using a heating medium such as steam to further expand the expanded beads (secondary expansion) and to fusion bond the expanded beads to each other, thereby to obtain a molded article having a shape corresponding to the shape of the mold cavity. Thus, the molded article of the present invention comprises a multiplicity of the expanded beads that are fusion bonded together by being heated in a mold.

The density of the molded article is preferably 10 to 100 kg/m³ for reasons of good balance between lightness in weight and rigidity thereof. The density is more preferably 20 kg/m³ or more from the viewpoint of improved rigidity. From the viewpoint of improved lightness in weight, the density of the molded article is more preferably 80 kg/m³ or less, still more preferably 50 kg/m³ or less, As used herein, the density of the molded article is as calculated by dividing the weight thereof by the volume thereof which is determined from the dimensions. When the molded article has a complicated shape, the volume may be measured by a water immersion method from the rise of the liquid level. In the production of a molded article having a low apparent density, it has been hitherto difficult to omit an aging step after the production, because of significant shrinkage and deformation. The molded article of the present invention, on the other hand, has excellent appearance and rigidity even when an aging step is omitted and even when the molded article has low density.

The molded article preferably has a voidage of 4% or more, more preferably 4.5% or more, still is more preferably 5% or more, from the viewpoint of more easily suppressing shrinkage and deformation (dimensional change) of the molded article. From the viewpoint of improving appearance and rigidity, the voidage of the molded article is preferably 10% or less, still more preferably 8% or less.

The voidage of the molded article may be determined as follows. First, a test piece having a rectangular parallelepiped shape and dimensions of 20 mm in length, 100 mm in width and 20 mm in height is cut out from the approximate central portion of the molded article. Then, the test piece is immersed in ethanol contained in a measuring cylinder, and a true volume Vc [L] of the test piece is determined from the rise of the liquid level of ethanol. In addition, an apparent volume Vd [L] is determined from the outer dimensions of the test piece. The voidage of the molded article is determined from the true volume Vc and the apparent volume Vd by the following formula:

$$\text{Voidage (\%)}=[(Vd-Vc)/Vd]\times100$$

It is also preferred that the molded article has a ratio of a 50% compressive stress (kPa) thereof to the above-mentioned density (kg/m³) thereof of 7.0 (kPa/(kg/m³)) or more, more preferably 7.5 (kPa/(kg/m³)) or more for reasons of improve rigidity thereof. It is further preferred that the molded article has a ratio of a 25% compressive stress (kPa) thereof to a 50% compressive stress (kPa) thereof of or more, more preferably 0.70 or more, for reasons that the molded article shows a reduced change in energy absorbing efficiency over a wide range of strain thereof and, hence allows use thereof for various applications. The 50% compressive stress and 25% compressive stress are as measured according to JIS K6767(1999). The molded article is suitably used in various fields such as a vehicle field such as an automobile and a construction field as a sound absorbing material, an impact absorbing material, a cushioning material, etc.

The following nonlimiting examples will further illustrate the present invention.

Expanded beads having a cover layer (namely multilayer expanded beads having a foamed core layer and a cover layer covering the foamed core layer) were produced in Examples 1 to 4 and Comparative Examples 1 to 3. The expanded beads having a cover layer (multilayer expanded beads) are hereinafter simply referred to as expanded beads.

The polypropylene-based resins (PP1, PP2, PP3 and PP4) used in Examples and Comparative Examples were as shown in Table 1.

TABLE 1

| Resin | Kind | Monomer content (wt %) | | Melting point (° C.) | MFR (g/10) | Flexural modulus (MPa) |
|---|---|---|---|---|---|---|
| | | ethylene | butene | | | |
| PP1 | ethylene-propylene random copolymer | 3.1 | — | 141 | 8 | 980 |
| PP2 | ethylene-propylene random copolymer | 1.4 | — | 153 | 7 | 1,470 |
| PP3 | ethylene-propylene-butene random copolymer | 0.5 | 9.5 | 140 | 8 | 900 |
| PP4 | ethylene-propylene-butene random copolymer | 3.1 | 3.8 | 133 | 6 | 650 |

In Table 1, the monomer contents and physical properties of the polypropylene-based resins were determined as follows.

Monomer Contents:

The monomer contents of the ethylene-propylene copolymers (PP1 and PP2) and the ethylene-propylene-butene copolymer (PP3 and PP4) were determined by customarily employed method using IR spectroscopy.

Flexural Modulus:

The polypropylene-based resin was heat-pressed at 230° C. to prepare a 4 mm thick sheet, from which a test piece having a length of 80 mm, a width of 10 mm and a thickness of 4 mm was cut out. The flexural modulus of the test piece was determined in accordance with JIS K7171(2008) under conditions involving an indenter radius R1 of 5 mm, a support base radius R2 of 5 mm, a distance between the fulcrums of 64 mm and a test speed of 2 mm/min.

Melting Point:

The melting point of the polypropylene-based resin was determined in accordance with JIS K7121(1987). Specifically, "(2) When the melting temperature is measured after a certain heat treatment" was adopted for conditioning. The conditioned test piece was heated from 30° C. to 200° C. at a heating rate of 10° C./min to obtain a DSC curve. The peak top temperature of the melting peak was taken as the melting point. As the measuring device, a heat flux differential scanning calorimeter (manufactured by SII NanoTechnology Inc., model number: DSC7020) was used.

Melt Flow Rate:

The melt flow rate (that is, the MFR) of the polypropylene-based resin was measured under the conditions of a temperature of 230° C. and a load of 2.16 kg in accordance with JIS K7210-1(2014).

Example 1

Production of Resin Particles:

The polypropylene-based resin PP1 shown in Table 1 was melted and kneaded in an extruder for forming a core layer at a maximum set temperature of 245° C. to obtain a first melt. Simultaneously, a polypropylene-based resin PP4 shown in Table 1 was melted and kneaded in an extruder for forming a cover layer at a maximum set temperature of 245° C. to provide a second melt. The first and second melts were a fed to a coextrusion die where the resin melts were joined to form a sheath-core type composite stream consisting of a core layer of the first melt and a cover layer of the second melt surrounding the core layer. The composite stream was extruded from the die, provided with a jig (thin rod) for forming a through hole, into a tubular strand. The strand having a through hole was cooled with water while being drawn and then cut with a pelletizer to obtain multilayer resin particles each having a mass of about 1.5 mg and each having a cylindrical core layer having a through hole and a cover layer covering the core layer. In the production of the multilayer resin particles, zinc borate as a cell controlling agent was supplied to the extruder for forming the core layer, so that the core layer contained 500 ppm by mass of zinc borate based on the weight of the polypropylene-based resin. In the production of the multilayer resin particles, a mass ratio of the resin constituting the core layer to the resin composing the cover layer was adjusted to 95:5.

The jig for forming the tubular strand was mounted within the die such that the flow passage of the composite stream within the die has an annular cross-section (being perpendicular to the flow direction of the composite stream) at the tip end portion of the die (namely, outlet of flow passage). As a result, the extrudate (strand) discharged from the tip of the die has an annular cross-section and is formed with the through hole. The jig used in Example 1 had a relatively long length (10 mm) in the extrusion direction from its upstream end to downstream end (tip end of the die).

Production of Expanded Beads:

The thus obtained resin particles (1 kg) were charged in a 5-L autoclave together with 3 L of water as a dispersion medium, to which 0.3 part by mass of kaolin as a dispersant and 0.004 parts by mass of a surfactant (sodium alkylbenzenesulfonate) each per 100 parts by mass of the resin particles were added. After addition of carbon dioxide as a blowing agent, the autoclave was sealed and the mixture in the autoclave was heated to the expansion temperature shown in Table 2-1 with stirring to form a dispersion containing expandable resin particles. The pressure inside the autoclave (impregnation pressure) at this time showed the value shown in Table 2-1. The dispersion in the autoclave was maintained at that expansion temperature for 15 minutes and thereafter released to the atmospheric pressure to foam and expand the expandable resin particles and to obtain expanded beads.

Figure 3:
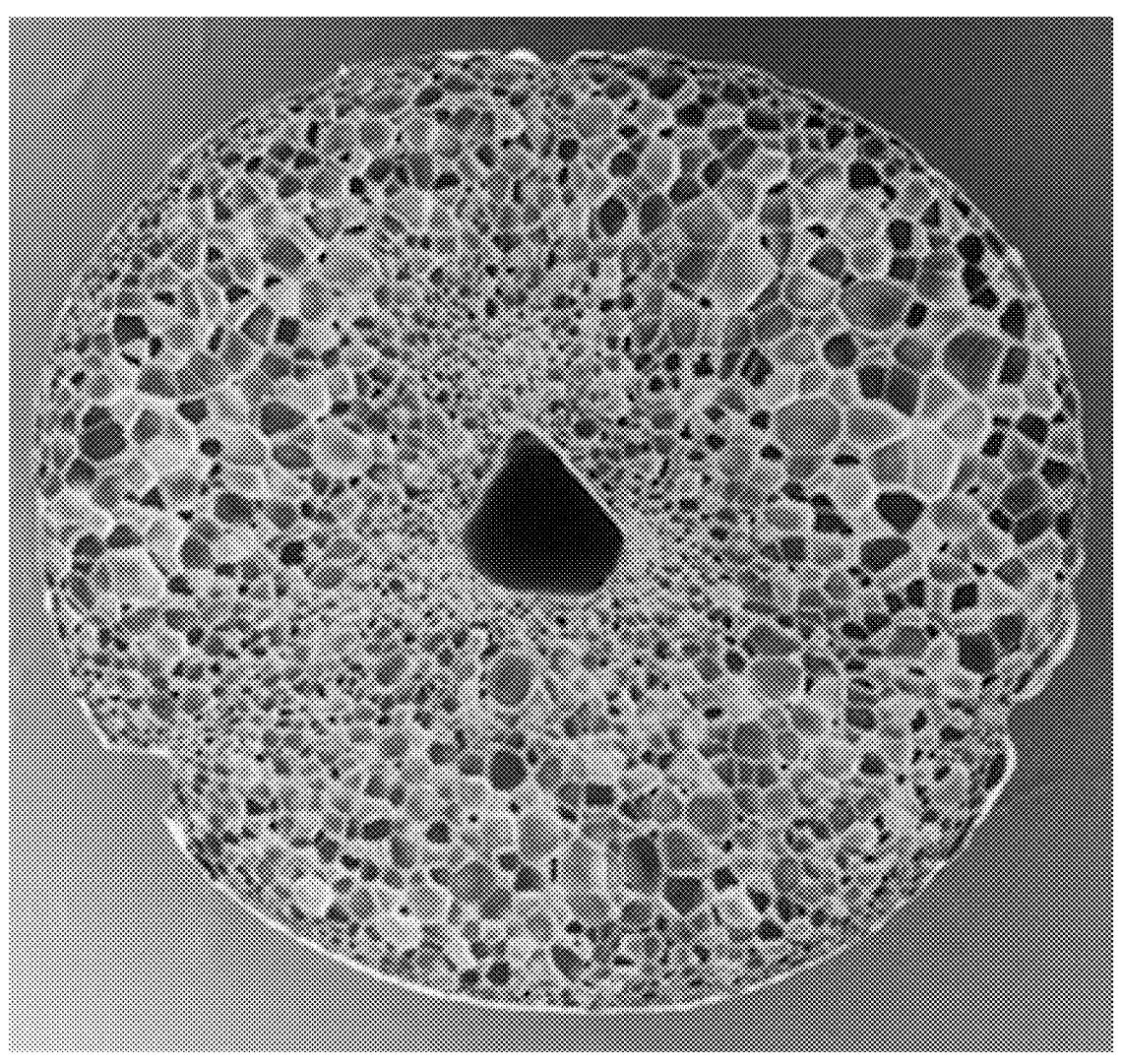
FIG. 3 is a scanning electron microscope (SEM) image of a cross-section perpendicular to a penetrating direction of a through hole of an expanded bead of the second embodiment obtained in Example 1.
Figure 4:
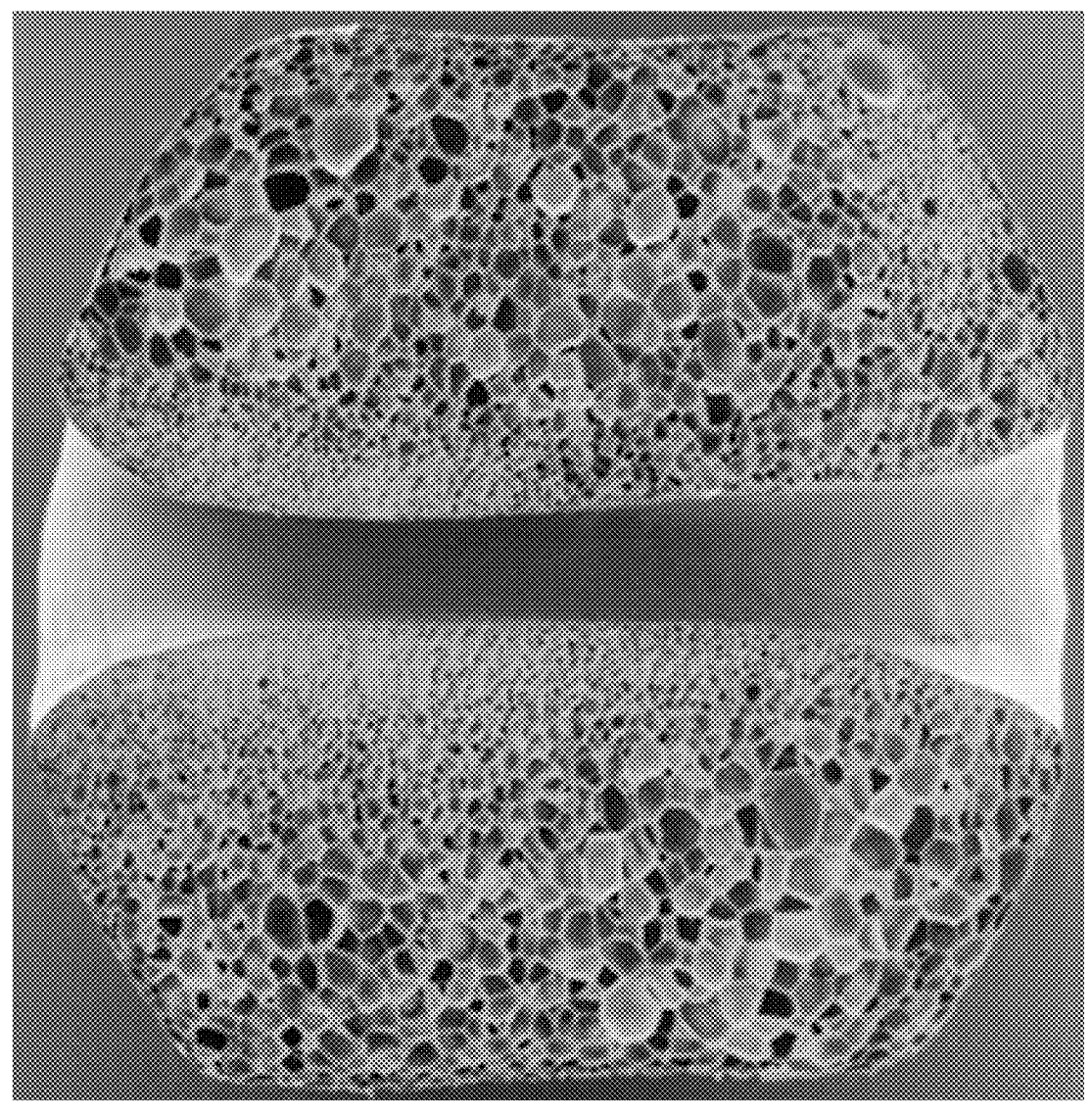
FIG. 4 is a scanning electron microscope (SEM) image of a cross-section parallel with the penetrating direction of the through hole in FIG. 3.

The thus obtained expanded beads were measured by scanning electron microscopy (SEM). FIG. 3 is a SEM image of a cross-section perpendicular to the penetrating direction of the through hole of the expanded bead and FIG. 4 is a SEM image of a cross-section in parallel with the penetrating direction of the through hole of the expanded bead. As seen in FIG. 3 and FIG. 4, finer cells are formed in an inner surface portion of the expanded bead.

TABLE 2-1

|  | Example | 1 | 2 | 3 | 4 |
|---|---|---|---|---|---|
| Resin Particles | Core layer resin | PP1 | PP2 | PP3 | PP1 |
|  | Cover layer resin | PP4 | PP4 | PP4 | PP4 |
| Expansion Conditions | Expansion temperature [° C.] | 146.0 | 157.2 | 145.7 | 146.0 |
|  | Impregnation pressure [MPa(G)] | 3.7 | 3.1 | 3.5 | 3.7 |
| Expanded Beads | Apparent density [kg/m³] | 51 | 50 | 51 | 51 |
|  | Bulk density [kg/m³] | 30 | 30 | 30 | 30 |
|  | Apparent density/Bulk density | 1.70 | 1.67 | 1.70 | 1.70 |
|  | Closed cell content [%] | 95 | 91 | 94 | 94 |
|  | Heat of fusion of high temperature peak $\Delta Hh$ [J/g] | 15.9 | 15.4 | 15.0 | 15.8 |
|  | Heat of fusion of all melting peaks $\Delta Ht$ [J/g] | 73 | 89 | 70 | 73 |
|  | $\Delta Hh/\Delta Ht$ | 0.22 | 0.17 | 0.21 | 0.22 |
|  | Average hole diameter d [mm] | 0.44 | 0.45 | 0.45 | 0.45 |
|  | Average outer diameter D [mm] | 2.6 | 2.7 | 2.7 | 2.6 |
|  | Average thickness t [mm] | 1.1 | 1.1 | 1.1 | 1.1 |
|  | d/D | 0.17 | 0.17 | 0.16 | 0.17 |
|  | t/D | 0.42 | 0.42 | 0.42 | 0.42 |

TABLE 2-1-continued

| Example | 1 | 2 | 3 | 4 |
|---|---|---|---|---|
| Average cell diameter La [μm] | 133 | 88 | 126 | 198 |
| Average cell diameter Li [μm] | 69 | 45 | 66 | 115 |
| Li/La | 0.52 | 0.51 | 0.52 | 0.58 |

TABLE 2-2

| | Comparative Example | 1 | 2 | 3 |
|---|---|---|---|---|
| Resin Particles | Core layer resin | PP1 | PP1 | PP1 |
| | Cover layer resin | PP4 | PP4 | PP4 |
| Expansion Conditions | Expansion temperature [° C.] | 146.5 | 145.5 | 145.5 |
| | Impregnation pressure [MPa(G)] | 3.8 | 3.8 | 3.8 |
| Expanded Beads | Apparent density [kg/m³] | 48 | 66 | 66 |
| | Bulk density [kg/m³] | 30 | 30 | 30 |
| | Apparent density/Bulk density | 1.60 | 2.20 | 2.20 |
| | Closed cell content [%] | 97 | 80 | 80 |
| | Heat of fusion of high temperature peak ΔHh [J/g] | 15.6 | 14.5 | 14.5 |
| | Heat of fusion of all melting peaks ΔHt [J/g] | 89 | 73 | 73 |
| | ΔHh/ΔHt | 0.18 | 0.20 | 0.20 |
| | Average hole diameter d [mm] | — | 2.20 | 2.20 |
| | Average outer diameter D [mm] | 3.5 | 3.0 | 3.0 |
| | Average thickness t [mm] | — | 0.4 | 0.4 |
| | d/D | — | 0.73 | 0.73 |
| | t/D | — | 0.14 | 0.14 |
| | Average cell diameter La [μm] | 107 | 274 | 274 |
| | Average cell diameter Li [μm] | — | 194 | 194 |
| | Li/La | — | 0.71 | 0.71 | obtained by subtracting the volume of the base resin of the expanded beads from the apparent volume of the expanded beads.

The thus pressurized expanded beads were filled in a flat plate molding mold having a length of 300 mm, a width of 250 mm and a thickness of 60 mm whose cracking amount was adjusted to 10% as shown in Table 3. The mold was clamped, and steam was supplied from both sides of the mold for 5 seconds to preheat and purge the mold. Then, steam was fed from one surface side of the mold to perform one direction flow heating until a pressure lower than a predetermined molding pressure by 0.08 MPa (G) was reached. Next, steam was supplied from the other side of the mold until the pressure reached 0.04 MPa (G) lower than the molding pressure to perform reversed one direction flow heating. Thereafter, steam was fed from both sides to perform substantial heating until the pressure reached the predetermined molding pressure shown in Table 3. After completion of the heating, the pressure was released, and water cooling was performed until the surface pressure caused by the expanding force of the molded product reached 0.04 MPa (G). The cooled molded product was taken out of the mold to obtain the molded article.

TABLE 3

| | | Example | | | | Comparative Example | | |
|---|---|---|---|---|---|---|---|---|
| | | 1 | 2 | 3 | 4 | 1 | 2 | 3 |
| In-Mold Molding | Internal pressure of expanded beads [MPa(G)] | 0.10 | 0.12 | 0.10 | 0.10 | 0.11 | 0.10 | 0.10 |
| | Molding pressure [MPa(G)] | 0.26 | 0.30 | 0.26 | 0.26 | 0.26 | 0.26 | 0.30 |
| | Cracking amount [%] | 10 | 10 | 10 | 10 | 10 | 10 | 30 |
| Molded Article | Density of molded article [kg/m³] | 33 | 34 | 32 | 33 | 33 | 33 | 42 |
| | Density of cut molded article [kg/m³] | 32 | 33 | 31 | 32 | 32 | 32 | 41 |
| | 25% Compressive stress [kPa] | 178 | 192 | 179 | 156 | 191 | 103 | 257 |
| | 50% Compressive stress [kPa] | 245 | 262 | 253 | 229 | 265 | 206 | 343 |
| | 50% Compressive stress/ Density of cut molded article [kPa/(kg/m³)] | 7.6 | 8.0 | 8.2 | 7.1 | 8.3 | 6.5 | 8.4 |
| | 25% Compressive stress/50% Compressive stress | 0.73 | 0.73 | 0.71 | 0.68 | 0.72 | 0.50 | 0.75 |
| | Voidage [%] | 6 | 7 | 5 | 10 | 3 | 23 | 16 |
| | Appearance | A+ | A+ | A+ | A | A+ | C | B |
| | Water cooling time | A | A | A | A | C | A | C |
| | Moldability without aging | good | good | good | good | poor | — | — |

In-Mold Molding of Molded Article:

The thus obtained expanded beads were dried at 23° C. for 24 hours were placed in an autoclave, to which compressed air was injected to pressurize the expanded beads and to apply thereto the internal pressure shown in Table 3. The internal pressure P (MPa(G)) imparted to the expanded beads was calculated from the following formula:

$$P=(W/M)\times R\times T/V$$

wherein W (g) is a difference between the weight Q (g) of the expanded beads whose inside pressure has been increased and which are just before being subjected to in-mold molding and the weight U (g) of the expanded beads which have been allowed to stand for 48 hours, M is the molecular weight of air, R is the gas constant, T represents an absolute temperature, and V represents a volume (L)

Example 2

Example 1 was repeated in the same manner as described therein except that polypropylene-based resin PP2 was used in place of PP1 and that the expansion temperature and the impregnation pressure were changed as shown in Table 2-1. The obtained expanded beads were subjected to in-mold molding in the same manner as described in Example 1 except that the internal pressure of the expanded beads and the molding pressure were changed as shown in Table 3.

Example 3

Example 1 was repeated in the same manner as described therein except that polypropylene-based resin PP3 was used in place of PP1 and that the expansion temperature and the impregnation pressure were changed as shown in Table 2-1. The obtained expanded beads were subjected to in-mold molding in the same manner as described in Example 1.

Example 4

Example 1 was repeated in the same manner as described therein except that the jig having a length of 7 mm was used. The obtained expanded beads were subjected to in-mold molding in the same manner as described in Example 1.

Comparative Example 1

Example 1 was repeated in the same manner as described therein except that the die had no jig for forming a through hole and that the expansion temperature and the impregnation pressure were changed as shown in Table 2-2. The obtained expanded beads were subjected to in-mold molding in the same manner as described in Example 1 except that the internal pressure of the expanded beads was changed as shown in Table 3.

Comparative Example 2

Example 1 was repeated in the same manner as described therein except that a jig having a greater diameter was used so as to form a tubular strand having a larger diameter through hole and that the expansion temperature and the impregnation pressure were changed as shown in Table 2-2. The jig had a length of 7 mm. The obtained expanded beads were subjected to in-mold molding in the same manner as described in Example 1.

Comparative Example 3

Comparative Example 2 was repeated in the same manner as described therein except that the molding pressure was increased as shown in Table 3.

The expanded beads and molded articles obtained in Examples 1 to 4 and Comparative Examples 1 to 3 were measured and evaluated for their physical properties and product states to give the results shown in Tables 2 and 3. The measurement of the physical properties of the expanded beads were performed after the expanded beads had been conditioned by allowing the expanded beads to stand under the conditions of a relative humidity of 50%, a temperature of 23° C. and a pressure of 1 atm for 24 hours. The measurement and evaluation on the molded articles were carried out without conducting an aging treatment after the production of the molded articles. The molded articles were only subjected to condition adjustment by allowing the molded articles to stand under the conditions of a relative humidity of 50%, a temperature of 23° C. and a pressure of 1 atm for 12 hours before the measurement and evaluation. In Tables 2-1 and 2-2, the apparent density, bulk density, closed cell content, heat of fusion of the high temperature peak ($\Delta$Hh), total heat of fusion of all fusion peaks ($\Delta$Ht), average hole diameter d of the through hole, average outer diameter D, average thickness t, average cell diameter La and average cell diameter Li of the inner surface portion of the expanded beads were measured by the methods described previously. The heat of fusion of the high temperature peak ($\Delta$Hh) and total heat of fusion of all fusion peaks ($\Delta$Ht) were measured on five expanded bead samples in total and the arithmetic mean of the five measured values is shown in Tables 2-1 and 2-2.

In Table 3, the measurement of the physical properties of the molded articles and evaluation of states thereof were carried out as follows.
Density:

The density of the molded article was calculated by dividing the weight thereof by the volume thereof which was determined from the outer dimensions thereof with appropriate unit conversion to [kg/m$^3$] being made.
Compressive Stresses at 50% Strain and 20% Strain:

A test piece having a length of 50 mm, a width of 50 mm, and a thickness of mm was cut out from the approximate central portion of the molded article such that a skin layer on the surface of the molded article was not included in the test piece. The 50% compressive stress and 25% compressive stress (kPa) were measure in accordance with JIS K6767 (1999) at a compression rate of 10 mm/min to determine compressive stresses at 50% strain and 25% strain of the molded article.
Density of Cut Molded Article:

A test piece was cut in the same manner as that in the measurement of the 50% and 25% compressive stress. The density of the cut molded article was calculated by dividing the weight of the test piece by the volume thereof which was determined from the outer dimensions thereof.
Voidage:

The voidage of the molded article was determined by the method described previously.
Appearance:

The molded article was evaluated for its appearance on the basis of the following criteria.

A+: Excellent (gaps between beads on the surface of the molded article are extremely small and irregularities caused by the through holes are almost not conspicuous).

A: Good (gaps between beads on the surface of the molded article are sufficiently small and irregularities caused by through holes are not very conspicuous).

B: Fair (gaps between beads and/or surface irregularities caused by through holes are slightly observed on the surface of the molded article).

C: No good (gaps between beads and/or surface irregularities caused by through holes are remarkably observed on the surface of the molded article of expanded beads).
Water Cooling Time:

As described above, after the completion of heating in the above production process of the molded article, the produced molded product was cooled with water. The time required from the start of water cooling until a pressure drop to 0.04 MPa (G) had been detected by a surface pressure gauge attached to an inner surface of the mold cavity was measured. Since the water cooling time occupies a major proportion of the molding cycle time, the shorter the water cooling time, the better is the molding cycle time. The water cooling time was evaluated on the basis of the following criteria:

A: Water cooling time is 50 seconds or less.

A: Water cooling time is more than 50 seconds and 120 seconds or less.

C: Water cooling time is more than 120 seconds.
Moldability without Aging:

As described above, the molded article taken out of the mold cavity was not subjected to an aging step which is generally carried out by allowing the molded product taken out of the mold cavity to stand in the atmosphere at 60 to 80° C. for a predetermined time (about 12 hours in general). Rather, the molded article was simply allowed to stand at 23° C. for 12 hours and evaluated for its moldability without aging. The moldability was evaluated in terms of (i) fusion bonding efficiency and (ii) shape recoverability which are described below. A molded article that showed acceptable level in both evaluation items (i) and (ii) was judged as having good moldability. A molded article whose evaluation on one or both items (i) and (ii) was unacceptable level was judged as having poor moldability. Evaluation of the molded articles obtained in Comparative Examples 2 and 3 was not carried out because the appearance thereof was no good.

(i) Fusion Bonding Efficiency

The molded article was folded and broken. The broken-out section exposed was visually inspected to count a number C1 of expanded beads exposed on the broken-out section and a number C2 of the expanded beads which underwent material fracture. A percentage $((C2/C1) \times 100)$ of the expanded beads which underwent material fracture relative to the number of the expanded beads present on the broken-out section represents a material fracture rate (%). The above measurement was performed on five different test pieces, and the arithmetic mean of the five fracture rates was defined as fusion bonding efficiency (%). Fusion bonding efficiency of 90% or more is an acceptable level and that of less than 90% is unacceptable level.

(ii) Shape Recoverability

The molded article was measured for its thicknesses at five positions including near the four corners (at positions 10 mm inside from each corner toward the center) and at a central portion (intersecting point between longitudinal and lateral bisecting lines). Next, a ratio (%) of the smallest thickness to the largest thickness was calculated. A ratio of 95% or more is an acceptable level and a ratio of less than 95% is an unacceptable level.

From the results shown in Table 3, it is appreciated that the expanded beads of Examples 1 to 4 according to the present invention are able to give a molded article having a desired shape and having both good appearance and rigidity even when an aging step is omitted. In the case of Example 4, however, since the average cell diameter Li in the inner surface portion is relatively large as compared with those of Examples 1 to 3, the appearance and compressive stress of the molded articles are inferior to those of Examples 1 to 3. The expanded beads of Comparative Example 1 have no through holes and, hence, the molded article obtained therefrom causes considerable shrinkage and deformation when the aging treatment is omitted. Further, the molding cycle time is very long. The expanded beads of Comparative 2 have a large average hole diameter d of the through holes and a large average cell diameter Li in the inner surface portion of the expanded beads and, hence, the molded article obtained therefrom has inferior appearance and low rigidity. In Comparative 3, the expanded beads of Comparative 2 are molded in a different molding conditions with a view toward improving the appearance and rigidity. However, the molding cycle time becomes longer though appearance of the product is slightly improved.

What is claimed is:

1. An expanded bead of polypropylene-based resin, comprising a through hole, and an inner peripheral surface defining said through hole,
   wherein
      said through hole has an average hole diameter d of 1 mm or less,
      said expanded bead has a closed cell content of 85% or more and an average cell diameter La of 50 μm or more and 300 μm or less, and
      said expanded bead has an inner surface portion that extends along the inner peripheral surface to a depth of 300 μm from the inner peripheral surface and that has an average cell diameter Li of 5 μm or more and 150 μm or less, wherein the average cell diameter Li of the inner surface portion is smaller than the average cell diameter La of the expanded bead.

2. The expanded bead according to claim 1, wherein the average cell diameter Li of the inner surface portion is 30 μm or more and 100 μm or less.

3. The expanded bead according to claim 1, wherein the expanded bead has an average thickness t of 1 mm or more and 2 mm or less, wherein the average thickness t is defined as (D−d)/2 where D is an average outer diameter and d is the average hole diameter.

4. The expanded bead according to claim 3, wherein a ratio t/D of the average thickness t to the average outer diameter D is 0.35 or more and 0.5 or less.

5. The expanded bead according to claim 1, wherein a ratio Li/La of the average cell diameter Li of the inner surface portion to the average cell diameter La of the expanded bead is 0.65 or less.

6. The expanded bead according to claim 1, wherein a ratio d/D of the average hole diameter d to an average outer diameter D is 0.4 or less.

7. The expanded bead according to claim 1, wherein the expanded bead has an apparent density of 10 kg/m³ or more and 150 kg/m³ or less.

8. The expanded bead according to claim 1, wherein the expanded bead has a cover layer that comprises a polyolefin-based resin and that forms at least part of an outer peripheral surface of the expanded bead.

9. The expanded bead according to claim 8, wherein a mass ratio of the resin constituting the foamed core layer to the resin composing the cover layer is 99.5:0.5 to 80:20 and wherein the polyolefin-based resin constituting the cover layer has a melting point which is lower than a melting point of the polypropylene-based resin.

10. A molded article comprising a multiplicity of the expanded beads according to claim 8, said multiplicity of the expanded beads being fusion bonded together by being heated in a mold.

11. A molded article comprising a multiplicity of the expanded beads according to claim 1, said multiplicity of the expanded beads being fusion bonded together by being heated in a mold.

* * * * *